(12) United States Patent
Rafique et al.

(10) Patent No.: US 10,735,099 B2
(45) Date of Patent: Aug. 4, 2020

(54) METHOD AND APPARATUS FOR PERFORMING EVENT-DRIVEN DIAGNOSTICS OR PROGNOSTICS OF A NETWORK BEHAVIOUR OF A HIERARCHICAL OPTICAL NETWORK

(71) Applicant: ADVA Optical Networking SE, Meiningen OT Dreissigacker (DE)

(72) Inventors: Danish Rafique, Meiningen (DE); Michael Eiselt, Kirchheim (DE)

(73) Assignee: ADVA OPTICAL NETWORKING SE, Meiningen OT Dreissigacker (DE)

( * ) Notice: Subject to any disclaimer, the term of this patent is extended or adjusted under 35 U.S.C. 154(b) by 0 days.

(21) Appl. No.: 16/267,011

(22) Filed: Feb. 4, 2019

(65) Prior Publication Data
US 2019/0245620 A1    Aug. 8, 2019

(30) Foreign Application Priority Data
Feb. 7, 2018   (EP) ..................................... 18155570

(51) Int. Cl.
*H04B 10/07* (2013.01)
*H04B 10/27* (2013.01)
*G06N 20/00* (2019.01)

(52) U.S. Cl.
CPC ............ *H04B 10/27* (2013.01); *G06N 20/00* (2019.01); *H04B 10/07* (2013.01); *H04J 2203/0058* (2013.01)

(58) Field of Classification Search
CPC ........ H04B 10/27; H04B 10/07; H04Q 11/04; G06N 20/00
See application file for complete search history.

(56) References Cited

U.S. PATENT DOCUMENTS 5,646,864 A   7/1997  Whitney
5,771,274 A   6/1998  Harris
(Continued)

FOREIGN PATENT DOCUMENTS

EP    0 810 807 A2    12/1997
EP    0 810 807 A3    1/1999

OTHER PUBLICATIONS

Communication of the Extended European Search Report for European Patent Application Serial No. 18155570.7 (dated Aug. 6, 2018).
(Continued)

*Primary Examiner* — Dzung D Tran
(74) *Attorney, Agent, or Firm* — Jenkins, Wilson, Taylor & Hunt, P.A.

(57) ABSTRACT

A method and apparatus for performing event-driven diagnostics and/or prognostics of a network behaviour of a hierarchical optical network comprising the steps of recording at least one set of historical multi-level events representing different hierarchy levels of said optical network; mining of machine learned event patterns within the recorded multi-level events; mapping the determined mined event patterns to a multi-level network topology of said optical network and/or to a channel connectivity of channels through said optical network; and matching observed real-time multi-level target events of said optical network with at least one of the previously determined mined event patterns and performing a unified cause and effect analysis of network states and/or network components of said optical network for a recognized matching event pattern using the network topology and/or channel connectivity associated with the matching event pattern.

16 Claims, 5 Drawing Sheets

(56) References Cited

U.S. PATENT DOCUMENTS

| | | | |
|---|---|---|---|
| 6,690,274 B1* | 2/2004 | Bristol | G05B 23/0267 |
| | | | 340/506 |
| 8,676,945 B2 | 3/2014 | Adams, Jr. et al. | |
| 10,326,796 B1* | 6/2019 | Varadarajan | H04L 63/1491 |
| 10,483,003 B1* | 11/2019 | McNair | G16H 50/30 |
| 2013/0190095 A1 | 7/2013 | Gadher et al. | |
| 2015/0254969 A1 | 9/2015 | Bishop et al. | |
| 2017/0223046 A1* | 8/2017 | Singh | H04L 43/062 |
| 2019/0228085 A1* | 7/2019 | Biswas | G06F 17/10 |

OTHER PUBLICATIONS

Sonogram, "Efficient Mining of Top-K Closed Sequences," J. of Convergence Information Technology, vol. 5, No. 5, pp. 1-9 (2010).

* cited by examiner

METHOD AND APPARATUS FOR PERFORMING EVENT-DRIVEN DIAGNOSTICS OR PROGNOSTICS OF A NETWORK BEHAVIOUR OF A HIERARCHICAL OPTICAL NETWORK

PRIORITY CLAIM

This application claims the priority benefit of European Patent Application No. 18155570.7, filed Feb. 7, 2018, the disclosure of which is incorporated herein by reference in its entirety.

TECHNICAL FIELD

The invention relates to a method and apparatus for performing event-driven diagnostics and/or prognostics of a network behaviour of a hierarchical optical network comprising one or more network segments.

TECHNICAL BACKGROUND

Optical networks are increasingly complex and comprise a plurality of network components at different hierarchy levels. The components and equipment of the optical network have to be monitored against failures and outages. The increasing data traffic in the optical network requires a short reaction time and, if possible, a proactive exchange and/or repair of network equipment and/or network lines.

In a conventional optical network, typically, optical time domain reflectometry is employed to perform a diagnosis of transmission line failures within the optical network including fiber cuts, signal losses, and/or failure locations. Detected failures in transmission equipment lead to trouble reports when handled by support staff actions. In optical transport networks, warnings and alarms can be issued as events when parameters of the network's equipment exceed predetermined threshold levels. A network management system can be used for processing fault alarms and maintenance events following a predefined workflow event procedure. Multiple events, resulting e.g. from a single fault, can be combined or correlated by such a network management system to avoid a larger number of alarm messages or alarm events.

However, existing diagnostic and monitoring systems used in conventional optical networks can typically lead to high service downtimes due to the passive maintenance approach taken by these systems. Most conventional diagnostic and monitoring systems provide for a local fault identification on one network device or node but no global fault identification. This may lead to limited and/or incomplete troubleshooting for different stakeholders within the optical network. Further, customer's response time may be constrained due to lack of support staff and/or the unavailability of servicing equipment. Accordingly, there is a need to provide a method and apparatus for improving diagnostics and/or prognostics of a network behaviour of a complex hierarchical optical network.

SUMMARY OF THE INVENTION

The invention provides according to a first aspect a method for performing event-driven diagnostics and/or prognostics of a network behaviour of a hierarchical optical network comprising the steps of:

recording at least one set of historical multi-level events representing different hierarchy levels of said optical network, mining of machine learned event patterns within the recorded multi-level events, mapping the determined mined event patterns to a multi-level network topology of the optical network and/or to a channel connectivity of channels through said optical network and matching observed real-time multi-level target events of said optical network with at least one of the previously determined mined event patterns and performing a unified cause and effect analysis of network states and/or network components of said optical network for a recognized matching event pattern using the network topology and/or channel connectivity associated with the matching event pattern.

In a possible embodiment of the method according to the first aspect of the present invention, lower-level events are aggregated according to the hierarchy levels of said optical network and the matching is performed on the basis of aggregated high-level events.

In a further possible embodiment of the method according to the first aspect of the present invention, the unified cause and effect analysis includes a backtracking reactive analysis of observed target events and a forward-looking proactive analysis of future events occurring within the optical network.

In a further possible embodiment of the method according to the first aspect of the present invention, the recorded multi-level events and/or event patterns are filtered, aggregated and/or sorted.

In a still further possible embodiment of the method according to the first aspect of the present invention, the recorded multi-level events comprise different event types including information events, warning events and/or failure events.

In a further possible embodiment of the method according to the first aspect of the present invention, the recorded multi-level events comprise events concerning components of the optical network and/or environmental events concerning the environment of said optical network.

In a still further possible embodiment of the method according to the first aspect of the present invention, the recorded multi-level events comprise events from different hierarchy levels of said optical network including system level events, subsystem level events, device level events, component level events and/or events from different protocol layers of a data protocol stack implemented in said optical network.

In a still further possible embodiment of the method according to the first aspect of the present invention, one or more independent sets of historical multi-level events are recorded for different network segments of said optical network.

In a still further possible embodiment of the method according to the first aspect of the present invention, one or more independent sets of historical multi-level events are recorded for the same network segment of said optical network representing different operation time periods of the respective network segment.

In a further possible embodiment of the method according to the first aspect of the present invention, event patterns for different network segments of said optical network are determined and shared for recognized matching event patterns within the same or other network segments of said optical network belonging to the same or different customers.

In a further possible embodiment of the method according to the first aspect of the present invention, matching at least one previously determined mined event pattern with the observed real-time multi-level target events of the optical network and the unified cause and effect analysis of the recognized matching event pattern are performed non-intrusively by an event analyzer.

In a still further possible embodiment of the method according to the first aspect of the present invention, the event patterns are mined within the recorded multi-level events according to predefined pattern mining parameter boundaries.

In a still further possible embodiment of the method according to the first aspect of the present invention, reactive and/or proactive notifications are issued if within the sequence of observed real-time multi-level target events of the optical network at least one of the plurality of previously determined mined event patterns is fully or partially recognized as a matching event pattern.

In a further possible embodiment of the method according to the first aspect of the present invention, event patterns with temporal dependencies are scaled in time based on a geographical system size.

In a further possible embodiment of the method according to the first aspect of the present invention, for the observed real-time multi-level target events received in a real-time target event stream from the optical network, a metric is assigned with respect to the existing previously determined event pattern. This metric can be a calculated similarity assigned iteratively with respect to the existing previously determined event patterns.

A further metric can be calculated that a recognized matching event pattern represents a root cause. This further metric can comprise a probability that a recognized matching event pattern represents a root cause. In a further possible embodiment of the method according to the first aspect of the present invention, an event database comprising recorded multi-level events is updated with observed real-time multi-level target events.

The invention further provides according to a second aspect an event analyzer for an optical network comprising the features of claim 16.

The invention provides according to the second aspect an event analyzer for an optical network,
wherein the event analyzer is adapted to mine machine learned event patterns within recorded sets of multi-level events representing different hierarchy levels and/or protocol layers of said optical network and is adapted to map determined event patterns to a multi-level network topology of said optical network and/or to a channel connectivity of channels provided via said optical network,
wherein the event analyzer is further adapted to match within a sequence of observed real-time multi-level target events of said optical network supplied to said event analyzer at least one of the previously determined mined event patterns and to perform a unified cause and effect analysis of network states and/or network components of said optical network for the recognized matching event pattern using the network topology and/or channel connectivity associated with the matching event pattern.

The invention further provides according to a further aspect an optical network comprising the features of claim 16.

The invention provides according to the third aspect an optical network having at least one network segment, wherein each network segment comprises an associated event analyzer according to the second aspect of the present invention adapted to share event patterns determined by the respective event analyzer with other event analyzers to recognize matching event patterns in the same or different network segments and adapted to report event patterns determined by the respective event analyzer to a central event analyzer of said optical network to recognize a matching event pattern in the optical network.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
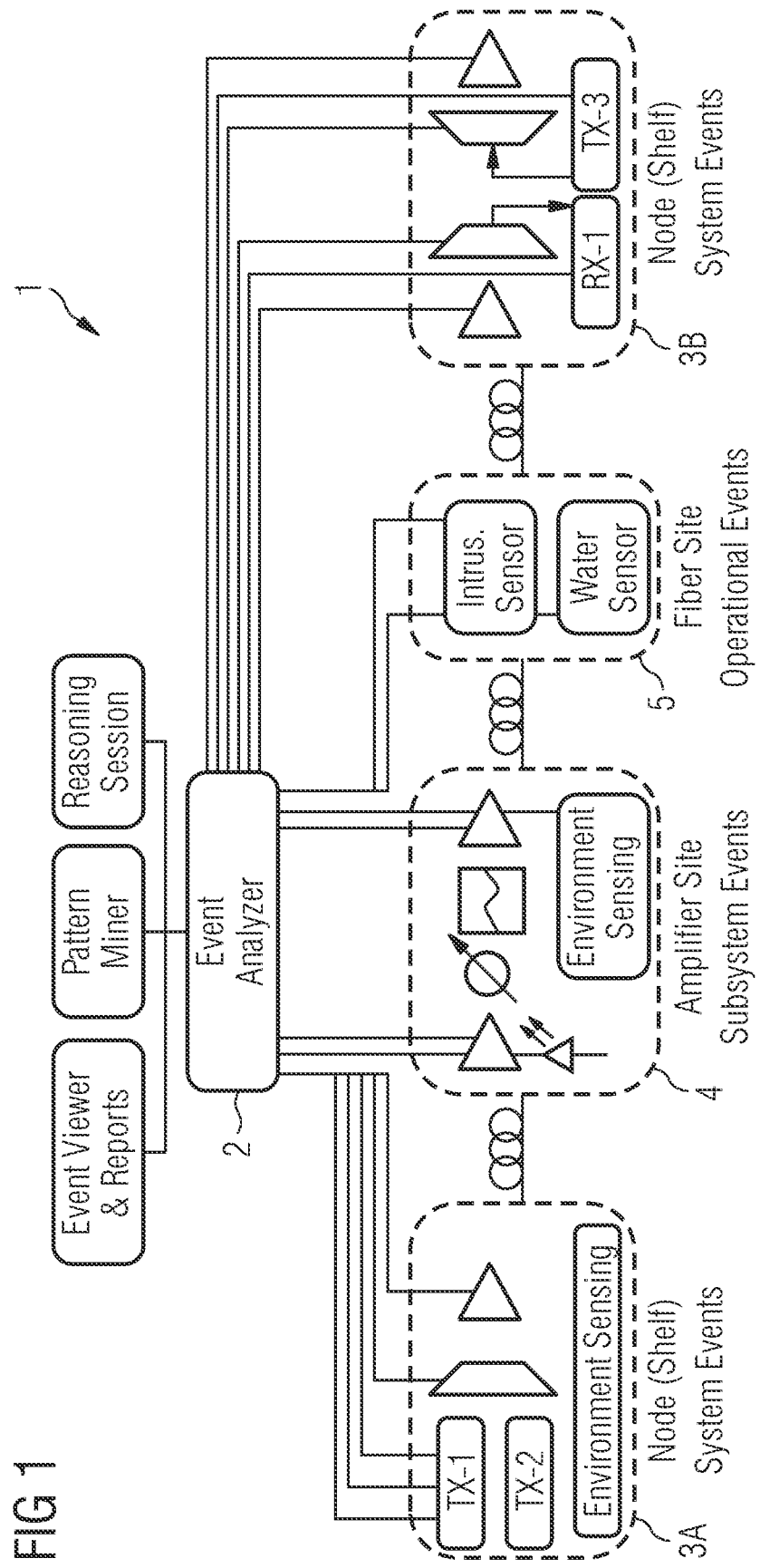
FIG. 1 shows a schematic diagram of an exemplary optical network comprising an event analyzer according to an aspect of the present invention.

As can be seen in the schematic diagram of the exemplary optical network or optical communication system illustrated in FIG. 1, an optical network 1 can comprise a plurality of different network components including subsystems and network nodes. As illustrated in FIG. 1, in the optical network 1 an event analyzer 2 is connected to different components of the optical network. In the illustrated example, an end-to-end connection is provided between a transmitting endpoint implemented on a first network node 3A and a receiving endpoint implemented on a second network node 3B. The first network node 3A is connected via an amplifier site 4 and a fiber site 5 by means of optical fibers to the second network node 3B. The event analyzer 2 of the optical network 1 is connected to components of the network nodes 3A, 3B to components of the amplifier site 4 and to components of the fiber site 5. The event analyzer 2 is adapted to perform an event-driven diagnostics and/or prognostics of a network behaviour of the optical network illustrated in FIG. 1. The event analyzer 2 forms a centralized framework for event-based real time diagnosis and prognosis.

Figure 5:
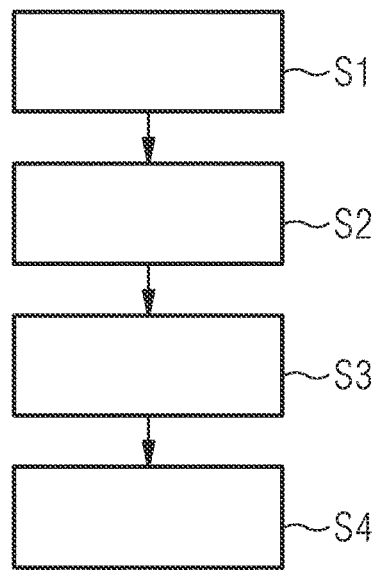
FIG. 5 shows a flowchart of a possible exemplary embodiment of a method for performing event-driven diagnostics and/or prognostics of a network behaviour of a hierarchical optical network according to an aspect of the present invention.

In a possible embodiment, the event analyzer 2 of the optical network 1 is adapted to perform a method as illustrated in the flowchart of FIG. 5. As can be seen in the flowchart of FIG. 5, the illustrated method comprises several main steps S1, S2, S3, S4.

In a first step S1, at least one set of historical multi-level events E representing different hierarchy levels of the respective optical network 1 can be recorded. The recorded multi-level events E can comprise different event types including information events, warning events and/or failure events. The multi-level events E can comprise events concerning components of the optical network 1 as illustrated in FIG. 1 and/or environmental events concerning the environment of the optical network. Further, the multi-level events E recorded in step S1 can comprise events E from different hierarchy levels HL of the optical network 1 including system level events, subsystem level events, device level events, component level events and/or events E from different protocol layers PL of a data protocol stack implemented in the optical network 1.

In a possible embodiment, the recorded multi-level events E can comprise three different types of events including information events $E_{inf}$, warning events $E_w$ and failure events $E_F$. For instance, the information events $E_{inf}$ can indicate whether a temperature T of a component is within a predefined temperature range. An information event $E_{inf}$ can also indicate an optical power level or can indicate whether a device or component is reachable. The information event $E_{inf}$ can also for instance indicate whether a device or component responds to SNMP. A further example for an information event $E_{inf}$ is an event indicating that a new device or component within the optical network 1 has been found or detected. A further example for an information event $E_{inf}$ is an event indicating that an equalization operation has been performed successfully.

Examples for warning events $E_w$ are for instance an event indicating a high temperature or a high power. A further example for a potentially warning event $E_w$ is that a DSP has been disabled for the respective device or component. A further example of a warning event $E_w$ is that a network scan has been started or that a maintenance of a component is demanded. A further example of a warning event $E_w$ is that an interruption has been detected.

A third type of recorded multi-level events are failure events $E_F$. Examples for failure events $E_F$ are for instance that an ROADM equalization error has occurred. Another example for a failure event $E_F$ is that a receiver I/P power is too low. Further, a failure event $E_F$ may indicate that a LAN interface is inactive or that a laser of a component is shutdown. A further example of a failure event $E_F$ is that the received error rate becomes critical.

Accordingly, there is a plurality of different multi-level events E received from different components of the optical network 1 including information events $E_{inf}$, warning events $E_w$ and/or failure events $E_F$. These multi-level events E including information, warning and/or failure events can come from different hierarchy levels HL of the optical network 1 and/or from different protocol layers PL of a data protocol stack. The event analyzer 2 of the optical network 1 comprises a centralized framework for event-based real-time event-driven diagnostics and/or prognostics of a network behaviour of the hierarchical optical network 1.

In the illustrated example of FIG. 1, the network nodes 3A, 3B forming the endpoints of a signal channel can provide system level events applied to the event analyzer 2. The amplifier site 4 may provide subsystem level events to the event analyzer 2 and the fiber site 5 including for instance a water sensor and an intrusion sensor may provide further subsystem level events and/or operational events to the event analyzer 2.

The optical network 1 may comprise one or several network segments. One or more independent sets of historical multi-level events E can be recorded in a possible embodiment for different network segments of the optical network 1. Further, it is possible that one or more independent sets of historical multi-level events E are recorded for the same network segment of said optical network 1 representing different operation time periods of the respective network segment. The event patterns for different network segments of the optical network 1 can be determined and shared for recognized matching event patterns within the same or other network segments of the optical network 1 belonging to the same or different customers.

The event analyzer 2 illustrated in FIG. 1 is adapted to mine in a step S2 machine learned event patterns within recorded sequences of multi-level events E. In a possible embodiment, the event patterns can be mined in step S2 within recorded sequences of multi-level events according to predefined pattern mining boundaries. For instance, only event patterns that occur more frequently than a given threshold value are considered. Further, a mining parameter boundary can comprise a minimum event pattern length, i.e. a minimum number of events E in an event pattern is required. A further possible predefined pattern mining parameter boundary can comprise specific target events, i.e. event messages to be mined by the event analyzer 2. A further exemplary predefined pattern mining parameter boundary used by the event analyzer 2 can comprise a desired event pattern number, i.e. a search is stopped by the event analyzer 2 after a certain pattern count has been reached. A further example of a predefined pattern mining parameter boundary used by the event analyzer 2 may comprise a maximum sequence duration, i.e. a maximum admissible time duration of the event pattern. A further possible predefined pattern mining parameter boundary can be a minimum time interval between similar back-to-back events, i.e. all duplicate events within a clean-up window are purged automatically. A further predefined pattern mining parameter boundary can be that only events E are considered that occur within a predefined time period as simultaneous, i.e. simultaneous events E are aggregated. A further possible pattern mining parameter boundary can be the extraction of pattern instances and temporal dependencies, i.e. information about temporal dependencies between different event patterns are gathered.

The event analyzer 2 of the optical network 1 is further adapted to map the determined mined event patterns in a step S3 to a multi-level network topology of the optical network 1 and/or to a channel connectivity of channels through the optical network 1. Event patterns are learned and used for diagnostics and prognostics purposes. The events E can be mapped to a multi-level network topology indicative of system, subsystem or device level associations related to data traffic. For instance, system level bit error rates BER, subsystem level amplifier gains and/or device level laser currents can be mapped in step S3 according to the network hierarchy of the optical network 1.

In a further step, the event analyzer 2 of the optical network 1 can perform a reasoning to draw conclusions for diagnostic and/or prognostic purposes from observed real-time multi-level target events. The event analyzer 2 can match in a step S4 observed real-time multi-level target events E received from the optical network 1 with at least one of the previously determined mined event patterns and can perform a unified cause and effect analysis of network states and/or network components of the respective optical network 1 for a recognized matching event pattern using the network topology and/or channel connectivity associated with the matching event pattern. The matching of at least one previously determined mined event pattern with the observed real time multi-level target events occurring in the optical network 1 and the unified cause and effect analysis of the recognized matching event pattern can be performed non-intrusively by the event analyzer 2. If within the sequence TES of observed real-time multi-level target events E of the optical network 1 at least one of the plurality of previously determined mined event patterns is fully or partially recognized as a matching event pattern, reactive and/or proactive notifications can be issued. In a possible embodiment, for the observed real-time multi-level target events E received by the event analyzer 2 in a real-time target event stream TES from the optical network 1, a calculated similarity can be assigned iteratively with respect to the existing previously determined event patterns and a probability that a recognized matching event pattern represents a root cause RC can be calculated in a reasoning session by a reasoning entity of the event analyzer 2.

In a possible embodiment, multi-level events and/or event patterns can be filtered, aggregated and/or sorted. For instance, lower-level events can be aggregated according to the hierarchy levels HL of the optical network 1 and the matching is performed by the event analyzer 2 on the basis of aggregated high-level events. Lower-level events can be aggregated in the hierarchy to the next hierarchy level so that only high-level reasoning is performed by the event analyzer 2. A lower-level reasoning can be triggered, if needed.

The event analyzer 2 of the optical network 1 illustrated in FIG. 1 can have access to an event database EDB of the system. The event database EDB can comprise recorded multi-level events E that can be updated with observed real-time multi-level target events E. The event database EDB comprises the recorded set of historical multi-level events E representing different hierarchy levels HL and/or protocol layers PL of the optical network 1 and is updated continuously in a possible embodiment with observed real-time multi-level target events E of the optical network 1 included in the target event stream TES.

The event analyzer 2 is adapted to mine machine learned event patterns within the recorded and updated sets of multi-level events representing different hierarchy levels HL and/or protocol layers PL of the optical network 1. The event analyzer 2 can be further adapted to map determined event patterns to a multi-level network topology of the optical network 1 and/or to a channel connectivity of channels provided via the optical network 1. The event analyzer 2 is further adapted to match in a reasoning session a sequence of observed real-time multi-level target events of the optical network 1 received by the event analyzer 2 in a target event stream TES with at least one of the previously determined mined event patterns adapted to perform a unified cause and effect analysis of network states and/or network components of the optical network 1 for the recognized matching event pattern using the network topology and/or channel connectivity associated with the matching event pattern.

In a possible embodiment, event patterns determined by the event analyzer 2 illustrated in FIG. 1 can be shared with other event analyzers 2 to recognize matching event patterns in the same or different network segments of the optical network 1. Further, it is possible to report event patterns determined by the event analyzer 2 to a central event analyzer of the optical network 1 to recognize a matching event pattern in the complete optical network 1. Event patterns with temporal dependencies can be scaled in time based on a geographical system size.

In the exemplary optical network 1 illustrated in FIG. 1, optical fiber line and transmission equipment events E can be fed to the event analyzer 2 which may be located at an SDN controller or orchestrator unit of the network 1. It is also possible to deploy several event analyzers 2 based on different network segments and to share information to a common global or central event analyzer 2 of the network.

Figure 2:
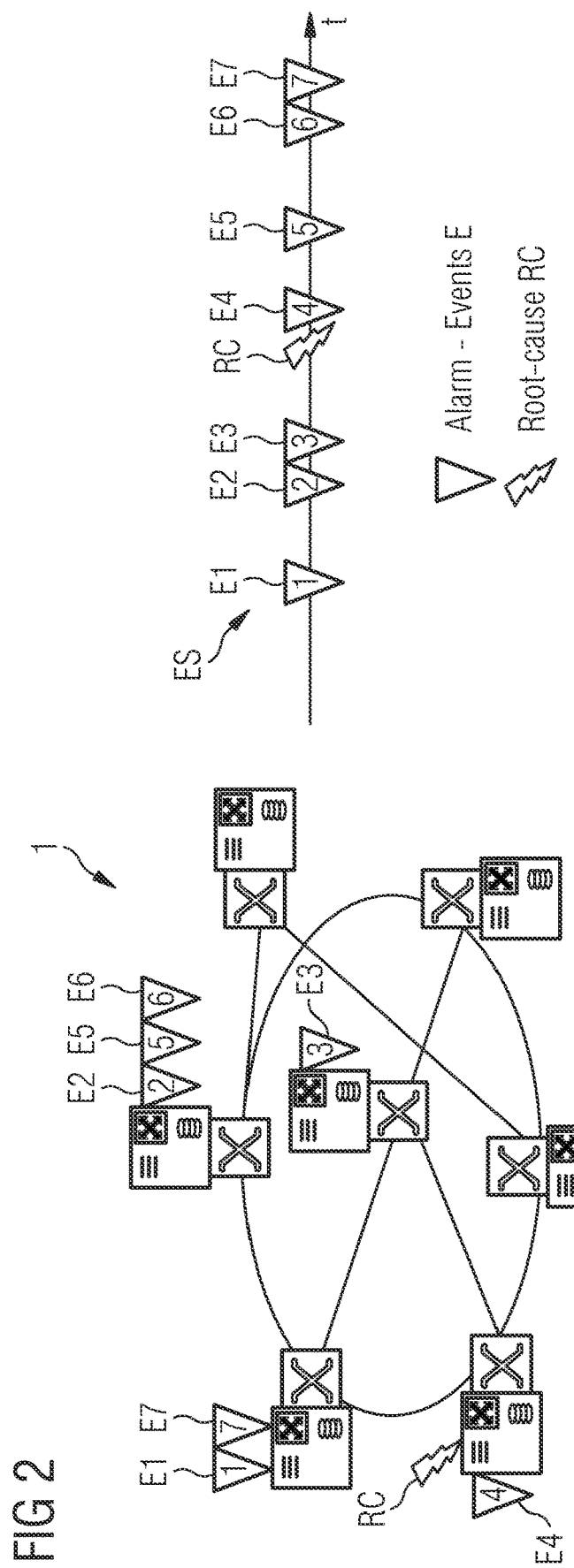
FIG. 2 shows a further schematic diagram for illustrating a typical exemplary meshed network topology of an optical network to illustrate the operation of a method and apparatus according to the present invention.

FIG. 2 illustrates a typical meshed network topology of an optical network 1. In the illustrated exemplary network topology, a single unified failure may lead to a series of highly complex events E with an event stream ES which may impose an offline and time-consuming troubleshooting to identify and rectify the occurred fault within the optical network 1. A single failure or fault can trigger an event stream ES comprising a plurality of different events E including alarm events as illustrated in FIG. 2.

Figure 3:
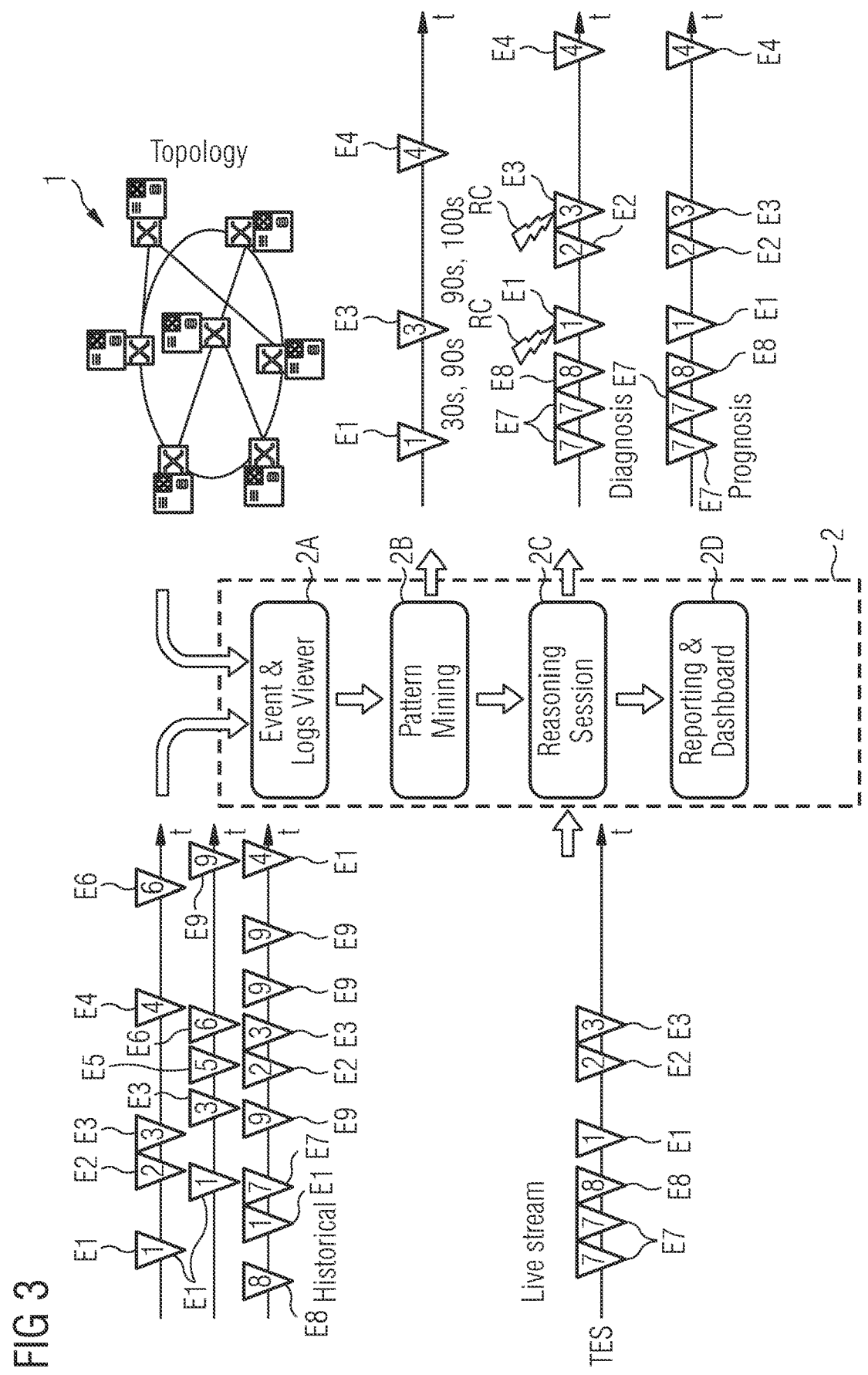
FIG. 3 shows a further schematic diagram for illustrating the operation of a method and apparatus for performing event-driven diagnostics and/or prognostics of a network behaviour of a hierarchical optical network according to the present invention.

FIG. 3 illustrates a possible structure of an event analyzer framework according to a possible exemplary embodiment of the present invention. The event analyzer 2 of the optical network 1 may comprise in the illustrated implementation an event viewer entity 2A which is adapted to pull historical event streams ES together with network maps of the optical network 1 indicating the topology of the optical network 1 from a database. The historical event streams ES can comprise recorded sets of historical multi-level events E representing different hierarchy levels HL of the optical network 1. Historical event streams ES may or may not belong to the optical network 1 under analysis. In a further step, a pattern mining entity 2B of the event analyzer 2 performs pattern mining. Machine learned event patterns are mined within the recorded historical multi-level events E. In the pattern mining step, hidden event patterns and their temporal relationships can be identified. Next, the real-time target event data is input in a target event stream TES to a reasoning entity 2C adapted to perform a reasoning session. The observed received real-time multi-level target events E received from the optical network 1 are matched by the reasoning session entity 2C of the event analyzer 2 with at least one of the previously determined mined event patterns. The unified cause and effect analysis of the network states and/or network components of the optical network 1 can be performed for a recognized matching event pattern using the network topology and/or channel connectivity associated with the matching event pattern. The results may be displayed on a reporting dashboard entity 2D and predictive notifications on upcoming future events E can be issued in notifications. As illustrated in FIG. 3, the event analyzer 2 can perform event-driven diagnostics and/or prognostics of the network behaviour of the investigated optical network 1.

In the illustrated example of FIG. 3, the event analyzer 2 may provide a reasoner diagnosis that event E1 and E3 are potential root causes RC of observed fault event E4. The reasoner prognosis issued by the event analyzer 2 can be for instance that in case of occurrences of event E1 and E3 fault event E4 is expected to happen after a predetermined time period.

Figure 4:
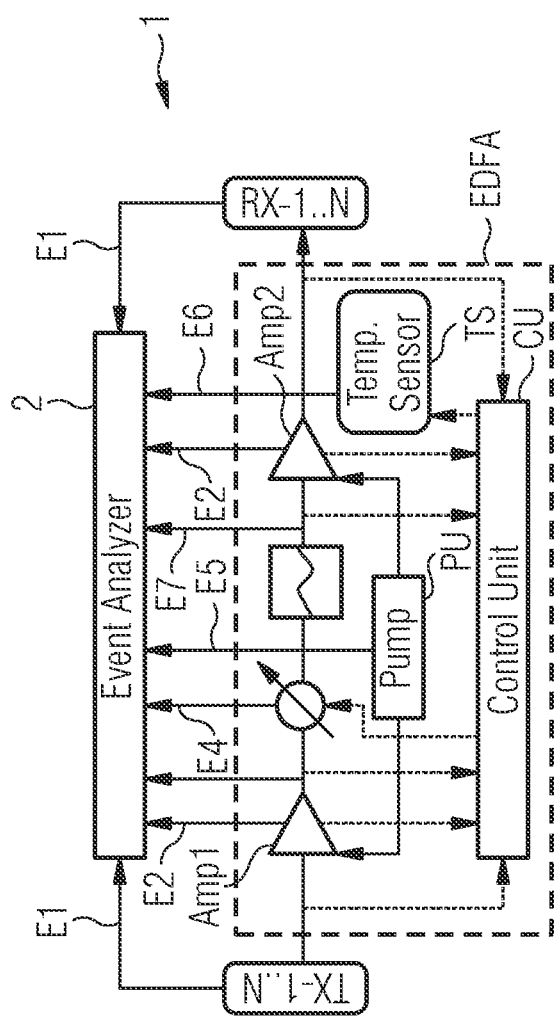
FIG. 4 illustrates a typical subsystem topology of a network subsystem to illustrate the operation of a method and apparatus according to the present invention.

FIG. 4 illustrates an exemplary EDFA subsystem topology of an optical network 1 together with the event analyzer 2 according to an aspect of the present invention. The event analyzer framework 2 illustrated in FIG. 4 can be adapted to visualize identified event patterns for service loss due to various potential EDFA events E in the respective subsystem. The EDFA amplifier comprises in the illustrated example a control unit CU, a temperature sensor TS that measures the temperature T on the chip and a pump unit PU for optical amplifiers. The different components of the EDFA amplifier can supply event streams ES to the event analyzer 2 as illustrated in FIG. 4. The transmitters (Tx) and receivers (Rx) can for instance notify failure events E1 to the event analyzer 2. Integrated amplifiers Amps can for instance provide EDFA power warning events E2 to the event analyzer 2. Further, they can provide EDFA gain control warning events E3. The VOA of the EDFA amplifier unit can provide for instance a failure EDFA VOA Power event E4 as illustrated in FIG. 4. Further, the pump unit PU can provide a warning event E5 and the temperature sensor TS can provide a warning event E6 as shown in FIG. 4. The pump unit PU may provide an EDFA pump loss warning event E7 and the event analyzer 2 may further receive an EDFA power I/P failure event E8.

FIG. 4 shows four exemplary target event patterns which the event analyzer 2 may receive from the optical network segment or optical subsystem also illustrated in FIG. 4. The event analyzer 2 can apply a pattern mining algorithm to determine machine learned event patterns within recorded multi-level events. The observed real time multi-level target events received from the EDFA subsystem in FIG. 4 can be matched by the event analyzer 2 with at least one of the previously determined mined event patterns. In a possible embodiment, a SPAM search procedure can be performed to explore a search space of event patterns. This can be done by appending single patterns recursively to each frequent event pattern to generate larger event patterns. The event analyzer 2 can be further adapted to define a calculated similarity with respect to existing previously determined event patterns. Further, a probability that a recognized matching event pattern represents the root cause RC can be calculated by the event analyzer 2. A similarity index for a given event pattern X with respect to event pattern Y can be defined as the proportion of similar events in event pattern X which contains the event pattern Y.

Figure 6:
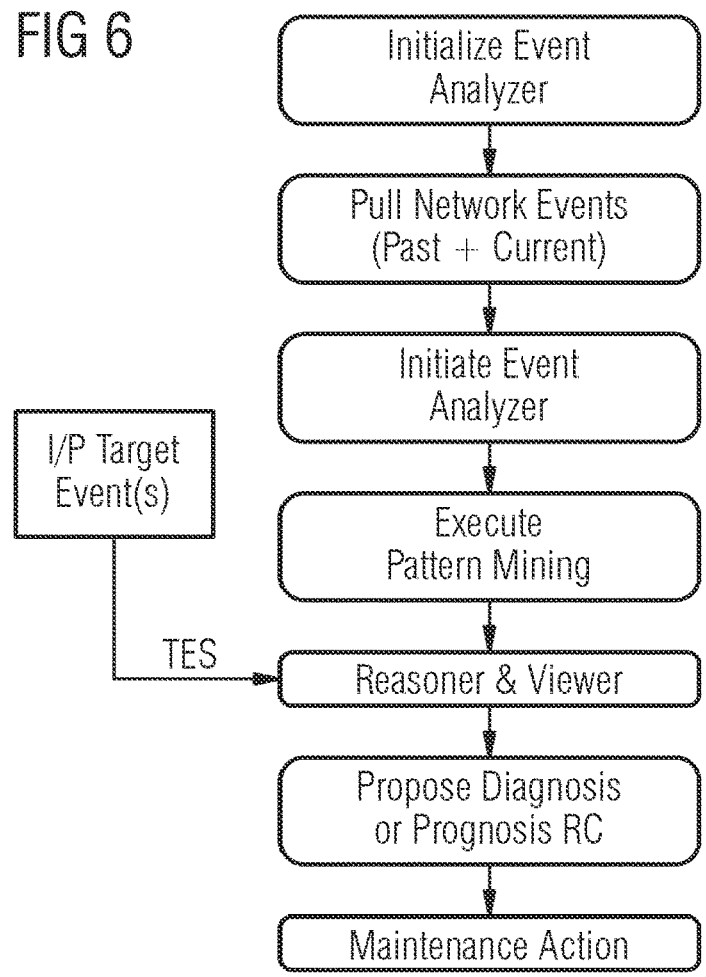
FIG. 6 shows a further schematic workflow of a possible exemplary embodiment of a method for performing event-driven diagnostics and/or prognostics of a network behaviour of a hierarchical optical network according to an aspect of the present invention.

FIG. 6 illustrates a possible exemplary embodiment of a method for performing event-driven diagnostics and/or prognostics of a network behaviour of an optical hierarchical network 1 according to an aspect of the present invention.

As illustrated in the workflow of FIG. 6, first, the event analyzer 2 of the optical network 1 can be initialized.

In a further step, historic network events can be pulled from the event database of the system.

The event analyzer 2 is then initiated and executes in a further step a pattern mining of machine learned event patterns within the recorded multi-level events.

In a reasoning session step, observed real-time multi-level target events E received in an input livestream TES by the event analyzer 2 are matched with at least one of the previously determined mined event patterns.

Further, a unified root cause and effect analysis of network states and/or network components of the optical network 1 are performed by the event analyzer 2 for a recognized matching event pattern using the network topology and/or channel connectivity associated with the matching event pattern.

According to the diagnosis and/or prognosis, a maintenance action can then be triggered by the event analyzer 2 as illustrated in the workflow of FIG. 6. The event analyzer 2 can perform a network infrastructure diagnosis and prognosis in real time.

As illustrated in FIG. 4, the optical network 1 can comprise several components to provide an end-to-end connection between a transmitting node Tx and a receiving node Rx. For instance, a signal channel can be initiated at a transmitting node Tx-1 and transmitted through the EDFA amplifier to end at the receiving node Rx-1.

For instance, if the event patterns E1, E2, E3, E4 are identified as an event pattern, an associated mapping can be performed for a given signal channel. Each event E can comprise an event type and an information indicating its hierarchy level HL. For instance, the first event E1 (error rate (Rx-n)) can comprise the event type "warning" or "failure" and may comprise the hierarchy level HL "system". Further, the second event E2 can for instance indicate an EDFA power O/P of the event type "warning" belonging to the system hierarchy level "subsystem". Further, the third event E3 "internal gain control" can also be of the event type "warning" belonging to the further hierarchy level "device". Further, the fourth event E4 "EDFA VOA power" may be of the event type "failure" and may comprise the hierarchy level "device". Accordingly event E1 belongs to hierarchy level "system", event E2 belongs to the hierarchy level "subsystem" and the events E3, E4 belong to the hierarchy level "device". For the precedence of E1, E2, E3, E4 in the pathway the signal channel has traversed, the equipment is mapped. In this example, the mapping is quite simple since the first event E1 having the highest hierarchy level HL (system) is followed by event E2 (having the hierarchy level subsystem) and event E3 (gain) and E4 (EDFA VOA power) both belonging to the hierarchy level "device".

Assuming a reactive approach (diagnosis), a system level event of general error rate deterioration can be localized at a subsystem level event of the inline amplifier induced power excursions and further diagnosed down to its device level events including local gain control failure or EDFA VOA power for e.g. pump laser power loss. The general connectivity is a secondary outcome as the mapped topology is dependent on the signal channel at hand. For instance, for another channel, there can be events before or after event E1 and event E4, respectively.

After the mapping of the determined mined event patterns to the multi-level network topology of the optical network 1 has been accomplished, a matching of the observed real-time multi-level target events E of the optical network 1 with at least one of the previously determined mined event patterns is performed in a reasoning session followed by a unified cause and effect analysis of network states and/or network components of the optical network 1 for a recognized matching event pattern using the network topology and/or channel connectivity associated with the matching event pattern.

For the example illustrated in FIG. 4, the following sequence of events E for the illustrated amplifier subsystem may occur: a temperature high event, a fan speed high event, a laser power low event, a gain low event and a transmit power low event. If such an event pattern has been previously mined in case that the first three events appear in the received real time event data (temperature high event, fan speed high event and laser power low event) the likely cause for the third event (laser power low) would be the first event (temperature high event). Likewise, a likely effect of the third event (laser power low) would be the fifth event (transmit power low).

In the event-driven diagnostics and/or prognostics method according to an aspect of the present invention, the method can be performed for an optical network 1 where traffic is carried over physical or virtual connections between a plurality of network nodes. With the method according to the present invention, at least one set of events which can represent a system, a subsystem or device level network hierarchical levels can be received and recorded. It is possible to autonomously cluster concurrent events wherein both known and unknown event patterns are determined and updated in operation in a pattern mining step using in a possible implementation an event analyzer 2. The events E can comprise information, warning or failure events or physical or operational parameters together with their time of occurrence in the system.

Further, events E are mapped to the multi-level network topology, indicative of system, subsystem or device level associations related to the traffic. For instance, a system level BER, a subsystem level amplifier gain and/or a device level current can be mapped according to the network hierarchy of the optical network 1. From the detection of partial or full occurrence of an established event pattern, it is possible to identify in real time a reaction on multiple levels for the unified diagnosis and prognosis of network traffic deterioration. Unified refers to both backtracking for reactive root cause search for a current event E and forward looking for proactive root cause prognosis for future events E or actions in a single event pattern. It is possible to provide means for multi-level association aggregation obtaining network segments for cause and effect identification at a given network layer. For example, multiple component level events can be aggregated to a subsystem event or multiple subsystem events to a system event. It is possible to use event patterns from one network segment for at least one or more unrelated network segments wherein a time scaling of event data based on geographical system size can be performed. The event stream ES can include configuration data, quality data and environmental data. The event analyzer 2 can comprise in a possible implementation an event viewer entity 2A, a pattern mining entity, a reasoning session entity 2C as well as a report building entity 2D. The determination of concurrent events can include autonomous data mining approaches. The method allows for a transfer and/or a sharing of learned knowledge among a plurality of unrelated network segments for initiating optimizations and in-operation training. Further, a shared central database can be used for identified event pattern updates across a plurality of network environments and/or network segments. The event analyzer 2 and its constituents can comprise hardware components and/or software components or a combination of hardware and software components. The event analyzer 2 can be used to modify network maintenance cycles and/or perform improvements on a network design of the optical network 1. The method provides for global diagnostics and/or prognostics of the network behaviour of the hierarchical optical network 1 and incorporates both line and equipment failures including physical and operational system, subsystem and device faults. The method and system 1 according to the present invention have low memory requirements due to the event-based diagnostics rather than performing a continuous manifold physical parameters monitoring. The method employs an event-driven fault learning architecture and provides a self-regulated method operation. An online learning can be performed of both known and unknown network faults. The fault information can be shared in real time with other network resources.

The method and system according to the present invention provides a framework where optical system, subsystem and optical line alarms can continuously be shared with a centralized controller wherein an event analyzer 2 can be implemented. The method and system 1 allows to autonomously learn and respond to vulnerable event patterns including information events, warning events and failure events and is even able to predict failures or faults before they occur in the optical network 1. For example, a system level event of traffic deterioration can be localized or mapped to a subsystem level event of an inline EDFA amplifier used for power excursion and further diagnosed down to its device level events of local gain control failure, pump laser power loss, passive insertion loss or temperature variations. On the other hand, to reduce and separate the amount of information, the events occurring in levels below the system level, i.e. on a subsystem level or a device level, can be made visible to higher levels by aggregation such that only single layer events need to be handled by the event analyzer 2 implemented on the controller. The method and system according to the present invention reduce significantly service downtimes due to its active approach. The method performs diagnostics and/or prognostics not only locally on a single device or node but in a global manner. The method and system according to the present invention consolidates both diagnosis and prognosis in a unified real-time framework allowing for a multi-layered proactive fault identification and to provide recommended actions. The method according to the present invention can be performed non-intrusively on observed real-time multi-level target events derived from the optical network 1. In a possible embodiment, the optical network 1 may comprise several network segments connected to each other e.g. by ROADMs. In a possible embodiment, for each network segment, an associated network segment event analyzer 2 can be provided. The different network segment event analyzers 2 can further be connected to a central event analyzer 2 of the whole optical network system 1. The different event analyzers 2 can share a common event database EDB. The method and system 1 according to the present invention provides for a very short reaction time in case that failures or faults occur within the optical network 1. The method and system 1 further allows for a proactive exchange and/or repair of network equipment and network lines.

The invention claimed is:

1. A method for performing event-driven diagnostics and/or prognostics of a network behaviour of a hierarchical optical network comprising the steps of:
    recording at least one set of historical multi-level events representing different hierarchy levels of said optical network;
    mining of machine learned event patterns within the recorded multi-level events;
    mapping the determined mined event patterns to a multi-level network topology of said optical network and/or to a channel connectivity of channels through said optical network; and
    matching observed real-time multi-level target events of said optical network with at least one of the previously determined mined event patterns and performing a unified cause and effect analysis of network states and/or network components of said optical network for a recognized matching event pattern using the network topology and/or channel connectivity associated with the matching event pattern,
    wherein lower-level events are aggregated according to the hierarchy levels of said optical network and the matching is performed on the basis of aggregated high-level events.

2. The method according to claim 1 wherein the unified cause and effect analysis includes a backtracking reactive analysis of observed target events and a forward-looking proactive analysis of future events occurring within the optical network.

3. The method according to claim 1 wherein the recorded multi-level events and/or event patterns are filtered, aggregated and/or sorted.

4. The method according to claim 1 wherein the recorded multi-level events comprise different event types including information events, warning events and/or failure events.

5. The method according to claim 1 wherein the recorded multi-level events comprise events concerning components of said optical network and/or environmental events concerning the environment of said optical network.

6. The method according to claim 1 wherein the recorded multi-level events comprise events from different hierarchy levels of said optical network including system level events, subsystem level events, device level events, component level events and/or events from different protocol layers of a data protocol stack implemented in said optical network.

7. The method according to claim 1 wherein one or more independent sets of historical multi-level events are recorded for different network segments of said optical network and/or wherein one or more independent sets of historical multi-level events are recorded for the same network segment of said optical network representing different operation time periods of the respective network segment.

8. The method according to claim 1 wherein event patterns for different network segments of said optical network are determined and shared for recognized matching event patterns within the same or other network segments of said optical network belonging to the same or different customers.

9. The method according to claim 1 wherein matching at least one previously determined mined event pattern with the observed real-time multi-level target events of the optical network and the unified cause and effect analysis of the recognized matching event pattern are performed non-intrusively by an event analyzer.

10. The method according to claim 1 wherein the event patterns are mined within the recorded multi-level events according to predefined pattern mining parameter boundaries.

11. The method according to claim 1 wherein if within the sequence of observed real-time multi-level target events of the optical network at least one of the plurality of previously determined mined event patterns is fully or partially recognized as a matching event pattern reactive and/or proactive notifications are issued.

12. The method according to claim 1 wherein event patterns with temporal dependencies are scaled in time based on a geographical system size.

13. The method according to claim 1 wherein for the observed real-time multi-level target events received in a real-time target event stream from the optical network, a calculated similarity is assigned iteratively with respect to the existing previously determined event patterns and a probability that a recognized matching event pattern represents a root cause is calculated.

14. The method according to claim 1 wherein an event database comprising recorded multi-level events is updated with observed real-time multi-level target events.

15. An event analyzer for an optical network,
wherein the event analyzer is adapted to mine machine learned event patterns within recorded sets of multi-level events representing different hierarchy levels and/or protocol layers of said optical network and is adapted to map determined event patterns to a multi-level network topology of said optical network and/or to a channel connectivity of channels provided via said optical network,
wherein the event analyzer is further adapted to match within a sequence of observed real-time multi-level target events of said optical network supplied to said event analyzer at least one of the previously determined mined event patterns and to perform a unified cause and effect analysis of network states and/or network components of said optical network for the recognized matching event pattern using the network topology and/or channel connectivity associated with the matching event pattern,
wherein the event analyzer is adapted to aggregate lower-level events according to the hierarchy levels of said optical network and to perform matching on the basis of aggregated high-level events.

16. An optical network having at least one network segment, wherein each network segment comprises an associated event analyzer according to claim 15 adapted to share event patterns determined by the respective event analyzer with other event analyzers to recognize matching event patterns in the same or different network segments and adapted to report event patterns determined by the respective event analyzer to a central event analyzer of said optical network to recognize a matching event pattern in the optical network.

* * * * *